April 28, 1959     R. H. FARCHMIN     2,884,241
AUXILIARY SPRINGS FOR AUTOMOBILE LEAF SPRINGS
Filed March 8, 1955

INVENTOR.
ROY H. FARCHMIN
BY
Flournoy Corey
ATTORNEY

United States Patent Office 2,884,241
Patented Apr. 28, 1959

2,884,241
AUXILIARY SPRINGS FOR AUTOMOBILE LEAF SPRINGS

Roy H. Farchmin, Cedar Rapids, Iowa, assignor to Pickwick Company, Cedar Rapids, Iowa, a corporation of Iowa Application March 8, 1955, Serial No. 492,861

4 Claims. (Cl. 267—48)

This invention is related to an auxiliary spring for an automotive vehicle, and particularly to a cantilever type spring which can be used to re-arch a leaf-type spring.

Modern automobiles are built with relatively soft springing action, which is accomplished by using extremely flexible springs of relatively long span, dampening their vibration with shock absorbers. Since this springing is soft, in the course of time and usage the springs begin to lose some of their strength and are inclined to sag. In addition to this, it is frequently desirable to place greater than normal weights in the vehicle, in which case the softer springs are not capable of bearing the load, and the entire automobile, particularly the rear end, sags to a point where operation of the vehicle becomes unsatisfactory and frequently dangerous.

Various devices have been proposed to reinforce the springs. Many of them are considered to be merely overload springs which come into action only when the spring has been depressed to a certain point or beyond. Such springs are spaced apart from the regular spring. Other devices have been provided in the form of an extra leaf, which is in contact with the other leaves in the spring, and act as stiffeners but do not bring the spring back to its original configuration.

It is therefore an object of my invention to provide a spring which will re-arch the regular spring.

Another object of my invention is to provide a spring which, in addition to re-arching the original spring, will dampen the vertical movement of the spring.

It is still another object of my invention to provide an auxiliary spring which can be used as an over-load member device.

It is yet another object of my invention to provide a device which can be adjusted to vary the arch of the automobile spring.

It is also an object of my invention to provide an auxiliary spring which can be adjusted to vary the arch along the longitudinal dimension of an automotive spring to differing degrees fore and aft of the axle mounting.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

Figure 1:
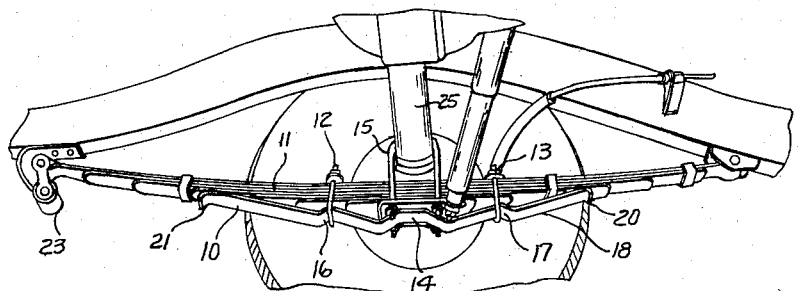
Figure 1 is a view in perspective of an auxiliary spring, constructed according to my invention, mounted on the lower side of a leaf spring.

Referring now to the drawings, and particularly to Figure 1; the auxiliary spring unit is shown mounted in place on the under side of an automotive spring. The spring 10 is formed of heat treated spring steel and is of substantial length. It is held in place on the lower face of the automobile spring 11 by a pair of U-bolts 12 and 13, and one of these auxiliary springs would be mounted underneath both of the longitudinal springs of an automobile which, in present vehicles, are found only on the rear end of the frame.

Figure 2:
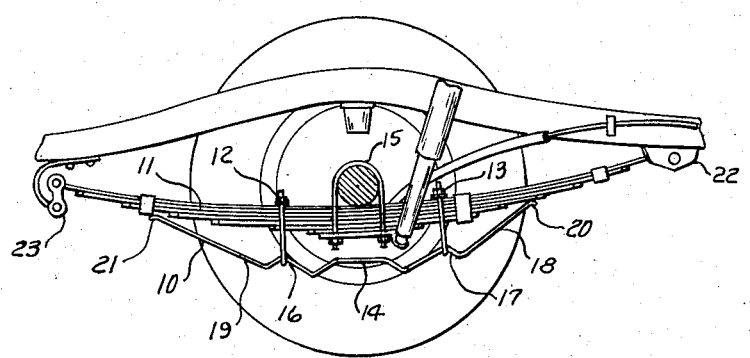
Figure 2 is a side view of an auxiliary spring loosely mounted on the regular spring as an over-load spring.
Figure 3:
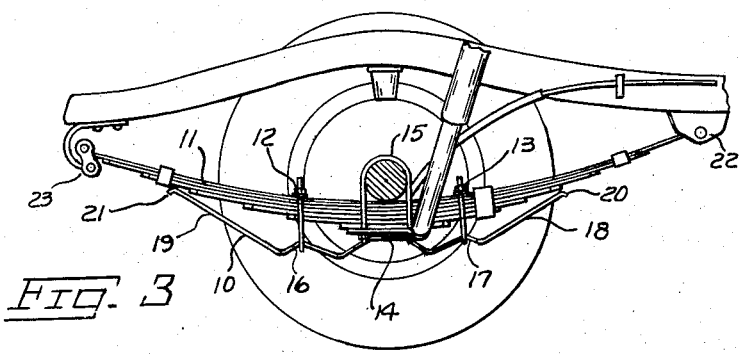
Figure 3 is a side view of an auxiliary spring mounted on a regular spring and drawn up tightly to cause the re-arching of the main spring.

Now referring more particularly to the configuration of the spring as shown in Figures 2 and 3; the central or base portion of the spring 14 is substantially flat and is adapted to be positioned directly underneath the rear axle mounting point. It is preferably narrow enough to go between the regular U-bolts, such as shown at 15, which hold the axle in position on the automobile spring. The flat steel then extends downwardly and outwardly from the base portion on each side, thence upwardly, thence again downwardly to form notches 16 and 17. These notches are provided to hold and position the two previously mentioned U-bolts 12 and 13. The flat strip then again extends outwardly for a substantial distance and slightly upwardly until it reaches a point where it can be brought in contact with the automobile spring at some distance from both sides of the axle.

It will be noted that these two substantially long portions or wings are unequal in length, the forward wing 18 being somewhat shorter than the rearward wing 19. The outer ends of these wings, in each instance, are curved downwardly at 20 and 21 to provide a curved surface which will bear against the bottom side of the automotive spring. This of course is to reduce friction, since these ends must be free to move longitudinally in relation to the automotive spring.

Referring now to the functional aspects of this spring, together with the adjustment range provided; I will describe the two different mountings shown in Figures 2 and 3.

In Figure 2 the spring is mounted as a helper spring or over-load spring. In this instance, the two U-bolts 12 and 13 are drawn up only a sufficient distance to cause a firm contact between the ends of the auxiliary spring and the automotive spring. It will be noted that in this instance, the base portion 14 is not in contact with the main spring. In operation, a load over the normal limits would cause the auxiliary spring to be brought into play. Also the spring would serve to dampen the flexing of the main spring when severe shocks were encountered by the rear wheels of the automobile.

In Figure 3, the base portion of the auxiliary spring has been drawn up flush with the bottom side of the automobile spring. This is done by drawing up the two U-bolts 12 and 13. It will become immediately apparent that the tighter these two U-bolts are drawn, the more upward force will be exerted against the main spring, even though it may be in a static condition. The effect of this tightening of these two U-bolts will be to re-arch the main spring. It would also be noted that it is possible to draw the two U-bolts up to an unequal extent, thus transferring the main re-arching effort to either side of the automobile spring. This, in effect, creates a situation in which one auxiliary spring serves as two separate springs. Once the base portion 14 is firmly positioned in relation to the automobile spring, the two wings may be operated independently to cause a different arch in each portion of the main spring.

For the same reasons, of course, the two springs on either side of the automobile may be adjusted to different points, with the result that the two rear springs of the automobile, although they may have sagged in an unequal relationship, may be brought into the same alignment in order to balance the rear end of the automobile.

It will also be noted that the two U-bolts are positioned at a substantial distance from the axle mounting. This is particularly important since it provides a holding and adjusting means which will not interfere with the various parts, such as shock absorbers, brake lines and the like which are usually mounted near the rear axle. This also makes it possible for one dimension of an auxiliary spring to fit a number of different makes of automobiles.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In an auxiliary spring, in combination with a semi-elliptical leaf spring mounted below an automotive frame and having an axle positioned intermediate the ends thereof, said auxiliary spring including a longitudinal member positioned below said semi-elliptical leaf spring, said member having a raised base portion positioned under the afore said axle, and further having outwardly, upwardly extending wings, adjustable U-bolt means positioned about said longitudinal member and extending upwardly therefrom to engage said semi-elliptical leaf spring, said longitudinal member including holding means intermediate the ends of said wing portions and said base portion, said U-bolt means being positioned therein to prevent the longitudinal movement thereof.

2. In combination with a vehicle frame and a semi-elliptical leaf spring having an axle mounted centrally thereof, a longitudinal spring member positioned below the semi-elliptical leaf spring, said longitudinal spring having a centrally located raised base portion, notches disposed on either side of said base portion at a distance from said portion, said base portion being positioned beneath said axle, U-bolts positioned on opposite sides of said axle, said U-bolts having their bight portions positioned in said notches and their leg portions adapted to engage said elliptical spring, said longitudinal spring member having wing portions extending outwardly coextensive with said elliptical spring, said wing portions being formed angularly upwardly and being further biased upwardly against said elliptical spring by the adjustment of said U-bolts.

3. In combination with a semi-elliptical leaf spring mounted on a frame and having an axle positioned on the upper surface thereof intermediate the ends thereof, a resilient longitudinal member having a raised flat base portion intermediate the ends thereof positioned below said semi-elliptical spring, the ends of said longitudinal member being in engagement with said semi-elliptical spring, notches comprising upwardly extending curved portions formed on both sides of said base portion at a distance therefrom, vertically adjustable means positioned in said notches and engaging said semi-elliptical spring to fixedly engage said member longitudinal laterally in relation to said semi-elliptical spring, said raised base portion providing an intermediate contact point between said lonigtudinal member and said semi-elliptical spring to permit the opposite ends of said longitudinal member to be selectively adjusted vertically in relation to the adjacent portion of the semi-elliptical spring.

4. In a device of the type described in combination with a semi-elliptical leaf spring, said semi-elliptical spring having an axle positioned centrally thereof, said device including a resilient longitudinal member having a central raised base portion positioned beneath and adapted to engage the center portion of said semi-elliptical spring adjacent said axle under tension, upwardly adjustable fastening means positioned on both sides of said base portion and engaging said semi-elliptical spring and adapted to adjustably position said longitudinal member vertcially in varying degrees of tension in relation to said semi-elliptical spring, the outer ends of said longitudinal member being formed angularly upwardly to a sufficient degree so that said outer ends will engage the under side of said semi-elliptical spring before said raised base portion engages said semi-elliptical spring as said fastening means are upwardly adjusted.

References Cited in the file of this patent

UNITED STATES PATENTS

| | | |
|---|---|---|
| 1,381,255 | Tisman | June 14, 1921 |
| 1,531,899 | Bailey | Mar. 31, 1925 |
| 1,854,442 | Baird | Apr. 19, 1932 |
| 1,870,787 | Smith | Aug. 9, 1932 |
| 2,112,148 | Drolet | Mar. 22, 1938 |